US012577064B2

(12) United States Patent
Baleriaux et al.

(10) Patent No.: US 12,577,064 B2
(45) Date of Patent: Mar. 17, 2026

(54) CONTAINER HANDLING SYSTEM AND HANDLING METHOD

(71) Applicant: ASEPTIC TECHNOLOGIES, Les Isnes (BE)

(72) Inventors: Patrick Baleriaux, Nalinnes (BE); Alain Thiry, Marchin (BE)

(73) Assignee: ASEPTIC TECHNOLOGIES, Les Isnes (BE)

( * ) Notice: Subject to any disclaimer, the term of this patent is extended or adjusted under 35 U.S.C. 154(b) by 247 days.

(21) Appl. No.: 18/360,610

(22) Filed: Jul. 27, 2023

(65) Prior Publication Data
US 2024/0034573 A1 Feb. 1, 2024

(30) Foreign Application Priority Data
Jul. 28, 2022 (BE) .................................. 2022/5603

(51) Int. Cl.
B65G 47/84 (2006.01)

(52) U.S. Cl.
CPC .... B65G 47/846 (2013.01); B65G 2201/0235 (2013.01)

(58) Field of Classification Search
CPC .................................................... B65G 47/846
USPC ................................ 198/470.1, 474.1, 476.1
See application file for complete search history.

(56) References Cited

U.S. PATENT DOCUMENTS

| | | | | | |
|---|---|---|---|---|---|
| 3,342,304 | A | * | 9/1967 | Greulich | B65B 35/44 |
| | | | | | 198/803.14 |
| 3,527,020 | A | * | 9/1970 | Mancini | B65B 7/16 |
| | | | | | 53/329.3 |

| | | | | | |
|---|---|---|---|---|---|
| 5,581,975 | A | * | 12/1996 | Trebbi | B65G 47/847 |
| | | | | | 53/284.6 |
| 6,938,753 | B2 | * | 9/2005 | Bonatti | B65G 47/847 |
| | | | | | 198/470.1 |
| 8,418,836 | B2 | * | 4/2013 | Papsdorf | B65G 47/846 |
| | | | | | 198/479.1 |
| 8,720,670 | B2 | * | 5/2014 | Schulnig | B65G 47/847 |
| | | | | | 198/470.1 |
| 9,415,951 | B2 | * | 8/2016 | Fahldieck | B08B 9/426 |
| 10,144,541 | B2 | * | 12/2018 | Rea | B65B 35/18 |

(Continued)

FOREIGN PATENT DOCUMENTS

| | | | |
|---|---|---|---|
| DE | 10 2018 126864 A1 | 4/2020 |
| EP | 3 912 938 A1 | 11/2021 |

(Continued)

OTHER PUBLICATIONS

Belgian International Type Search Report for corresponding Belgian Patent Application No. BE2022/5603, completed Mar. 9, 2023 (10 sheets).

*Primary Examiner* — Douglas A Hess
(74) *Attorney, Agent, or Firm* — Womble Bond Dickinson (US) LLP

(57) ABSTRACT

The invention relates to a system for handling containers suitable for containing a medicinal substance, comprising a wheel movable in rotation about an axis; container handling clamps, the clamps being hinged to the wheel and being movable between a closed configuration for gripping a container and an open configuration for releasing a container, each pair of clamps comprising ramps suitable for lifting or depositing a container as the clamps move from one configuration to another. The invention also relates to a method for handling containers.

19 Claims, 3 Drawing Sheets

(56) References Cited

U.S. PATENT DOCUMENTS

| | | | |
|---|---|---|---|
| 10,472,105 B2 * | 11/2019 | Castellari | B65B 29/022 |
| 10,766,146 B2 * | 9/2020 | Landler | B25J 15/0028 |
| 10,906,752 B2 * | 2/2021 | Schopp | B65G 47/846 |
| 12,115,714 B2 * | 10/2024 | Baumgarte | B29C 49/42073 |
| 12,291,441 B2 * | 5/2025 | Kornprobst | A61L 2/14 |
| 2021/0362350 A1 | 11/2021 | Zeitler et al. | |

FOREIGN PATENT DOCUMENTS

| | | | |
|---|---|---|---|
| IT | PR20 090 040 A1 | 11/2010 | |
| WO | WO-2013046105 A1 * | 4/2013 | G01G 15/00 |

* cited by examiner

CONTAINER HANDLING SYSTEM AND HANDLING METHOD

CROSS-REFERENCE TO RELATED APPLICATION

This application claims priority to and the benefit of Belgian Patent Application No. BE2022/5603, filed on Jul. 28, 2022, the entire content of which is incorporated herein by reference.

TECHNICAL FIELD

This invention relates to a system for handling containers suitable for containing a medicinal substance and a method for handling containers.

BACKGROUND

Containers suitable for containing a medicinal substance (such as vaccines) or other biological substances (such as cells) are handled when the substance is introduced into the container. Extreme care must be taken when performing operations on the containers.

There is therefore a need for a container handling system that allows containers to be handled with care.

DESCRIPTION OF THE INVENTION

To this end, the invention proposes a system for handling containers suitable for containing a medicinal substance, comprising a wheel movable in rotation about an axis, container handling clamps, the clamps being hinged to the wheel and being suitable for moving between a closed configuration for gripping a container and an open configuration for releasing a container, each pair of clamps comprising ramps suitable for lifting or depositing a container when the clamps move from one configuration to another.

In one variant, the ramps are suitable for lifting a container between the open configuration and the closed configuration of the clamps and are suitable for depositing a container between the closed configuration and the open configuration of the clamps.

In one variant, the clamps in the closed configuration immobilise a container in a vertical direction.

In one embodiment, the clamps in the closed configuration are adapted to immobilise the container with a space between the clamps and the container, around the outer lateral surface of the container.

In one embodiment, the ramps of a pair of clamps have a slope facing each other.

In one embodiment, the system also comprises stations, the clamps being adapted to deposit a container on the stations and to lift a container from the stations.

In one embodiment, the stations comprise a groove in which the ramps of a clamp are suitable for moving between the open and closed configurations.

In one variant, between the open and closed configurations of the clamps, the ramps are suitable for penetrating the groove to lift a container from a station.

In one variant, between the closed configuration and the open configuration of the clamps, the ramps are suitable for moving away from each other in the groove to deposit a container on a station.

In one variant, the wheel is movable in rotation incrementally between different stations.

According to one variant, the system also comprises, at each station, members amongst members for introducing a container between the clamps, members for introducing a medicinal substance into the containers, members for weighing the empty containers containing the medicinal substance, members for closing the containers, and members for affixing a capsule to the containers.

In one embodiment, the clamps are suitable for moving away between the closed configuration and the open configuration by a dimension greater than the outer diameter of a container.

In one embodiment, the clamps are suitable for moving away from each other between the closed configuration and the open configuration by a dimension less than the outer diameter of a container.

In one variant, the clamps comprise an arm hinged to the wheel on the one hand, and supporting a jaw and a ramp on the other.

In one variant, the ramps are suitable for presenting a gripping area of a container to the jaws in the closed configuration of the clamps.

In one variant, the clamps are electrically connected to the earth of the system.

In one variant, the clamps are made of a synthetic material suitable for conducting electrostatic charges.

The invention also relates to a method for handling containers suitable for containing a medicinal substance, the method comprising providing the system as previously described and providing containers, handling the containers with the system.

In one embodiment, the handling of the containers by the system comprises lifting containers from stations of the system or depositing containers on the stations by passing clamps between closed and open configurations.

In one variant, between the open and closed configurations of the clamps, the ramps penetrate into a groove of the stations to lift a container from the station.

In one variant, between the closed configuration and the open configuration of the clamps, the ramps move away from each other in a groove of the stations to deposit a container on the station.

The use of the verb "comprise" and its variants, as well as its conjugations in this document, cannot in any way exclude the presence of elements other than those mentioned. The use in this document of the indefinite article "a", "an", or the definite article "the" to introduce an element does not exclude the presence of a plurality of these elements.

The terms "first", "second", "third", etc. are used in this scope of this document exclusively to differentiate between different elements, without implying any order between these elements.

All the preferred embodiments and all the advantages of the handling system according to the invention apply mutatis mutandis to the present container handling method, and vice versa. The various embodiments can be considered individually or in combination.

BRIEF DESCRIPTION OF THE FIGURES

Further characteristics and advantages of the present invention will become apparent from the following detailed description, for the understanding of which reference is made to the attached figures which show:

FIG. 5A, a schematic illustration of a clamp of the system shown in FIG. 1 clamping a container;

FIG. 5B, a schematic illustration of a filling needle station of the system shown in FIG. 1;

FIG. 5D, a schematic illustration of a closing station of the system shown in FIG. 1; and FIG. 5E, a schematic illustration of a capping station of the system shown FIG. 1.

Figure 1:
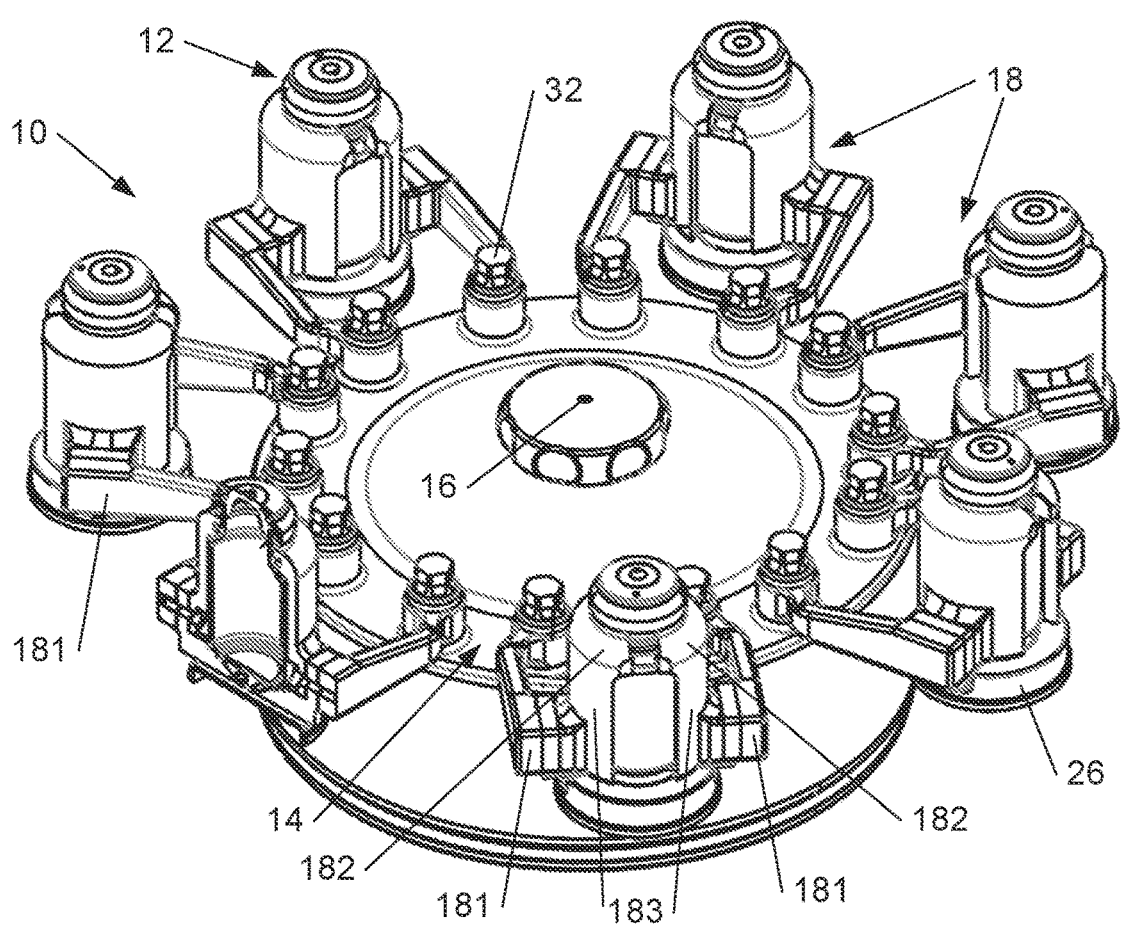
FIG. 1 shows a schematic view of an example of embodiment of a system according to the invention.

The drawings in the figures are not to scale. Similar elements are generally denoted by similar references in the figures. In the scope of this document, the same or similar elements may have the same references. Furthermore, the presence of reference numbers or letters in the drawings cannot be considered as limiting, even when these numbers or letters are indicated in the claims.

DETAILED DESCRIPTION OF EMBODIMENTS OF THE INVENTION

The invention relates to a system for handling containers suitable for containing a medicinal substance. The system comprises a wheel movable in rotation about an axis and container handling clamps, the clamps being hinged to the wheel. The clamps are movable between a closed configuration for gripping a container and an open configuration for releasing a container. Each pair of clamps comprises ramps suitable for lifting or depositing a container as the clamps move from one configuration to another. This allows to grip or release a container along the ramps smoothly, so that containers can be handled with care.

FIG. 1 shows a schematic view of an example of embodiment of a system according to the invention. The system 10 allows containers 12 suitable for containing a medicinal substance to be handled. A container 12 is suitable for receiving a substance, which may be a medicinal or pharmaceutical substance. The use in this document of the expression "medicinal substance" or "pharmaceutical substance" or "substance" covers both any type of medicinal product, whether chemical or biological, or any ingredient intended to be incorporated into the formulation of a medicinal product, as well as all other biological substances requiring a low-temperature storage, such as cells for example. The substance is preferably fluid or liquid. The substance can be intended to be injected into the body of a patient, human or animal, for example with a syringe. The substance can be injected into the patient all at once, or continuously. The container can receive a predefined quantity of medicinal substance. For example, the container may receive a single dose of substance. The quantity of substance then corresponds to what is intended to be administered to the patient at one time.

The quantity of substance to be introduced into the containers 12 is very precisely defined. In this way, the system comprising the containers 12 allows them to be handled precisely and therefore carefully during the steps of processing the containers 12, in particular the steps of introducing substance into the containers 12 and checking the quantity introduced. To achieve this, the system 10 comprises a wheel 14 that can be rotated about an axis 16. The wheel 14 is movable in rotation in one plane. The wheel 14 allows a plurality of containers 12 to be driven in rotation through the various steps for introducing the substance. The wheel 14 successively drives the containers to a number of stations for allowing the process of the containers 12. The wheel can be rotated incrementally between different stations, allowing a precise positioning of the containers 12 at each station. By way of example, seven stations are shown in FIG. 1. A first station can be envisaged in which a container 12 is delivered to the system 10. For example, a robot not shown in the figures can load a container 12 to be processed into the system 10. The container 12 loaded on the system 10 can then be driven to a second station where the container 12 is weighed empty. According to a third station, the substance is introduced into the container 12 by means of a filling needle before the container is driven to a fourth station in which the container 12 is closed after the removal of the filling needle. Driven to a fifth station, the container 12 can be weighed along with the substance. Then, at a sixth station, a capsule can be affixed to the container 12 to protect the outer face of a cap for closing the container. At the end of the rotation, the wheel 14 drives the container 12 to a seventh station where the container 12 can be removed from the system 10, for example by a robot. At each increment of the wheel, a plurality of containers 12 (in this case seven containers 12 according to FIG. 1) are simultaneously processed at different stations. At each station, members (or devices or means) are provided, amongst members for introducing a container between the clamps, members for introducing the medicinal substance into the containers, members for weighing the empty containers containing the medicinal substance, members for closing the containers, and members for affixing a capsule to the containers. Such a system 10 allows containers 12 to be processed accurately at industrial speeds.

The system 10 comprises clamps 18 for handling the containers 12. The clamps 18 are hinged to the wheel 14, allowing them to be actuated according to the angular position of the wheel 14. The clamps 18 are movable between a closed configuration for gripping a container 12 and an open configuration for releasing the container 12. So, depending on the angular position of the wheel 14, the containers 12 are engaged in the clamps 18 or are released from the clamps 18. Depending on the station at which one or other of the containers 12 is driven, and on the processing step that the containers 12 receive at each station, the clamps are in an open or closed configuration. For example, the clamps are in an open configuration at a weighing station and are in a closed configuration at a substance introduction or capsule application station. In FIG. 1, the clamps are shown in a closed configuration in which the containers 12 are gripped by the clamps 18—for example to change stations. It is possible for some of the clamps to be in a closed configuration for gripping the containers 12 and some of the clamps to be in an open configuration for releasing the containers 12. The gripping or the releasing of the containers by the clamps 18 depends on the processing step of the containers 12.

The clamps 18 operate in pairs to grip the containers 12. Each pair of clamps 18 comprises ramps 20 for lifting or depositing a container 12 as the clamps 18 move from one configuration to another. The ramps 20 allow the containers 12 to move smoothly between the closed and open configurations of the clamps 18.

Figure 2:
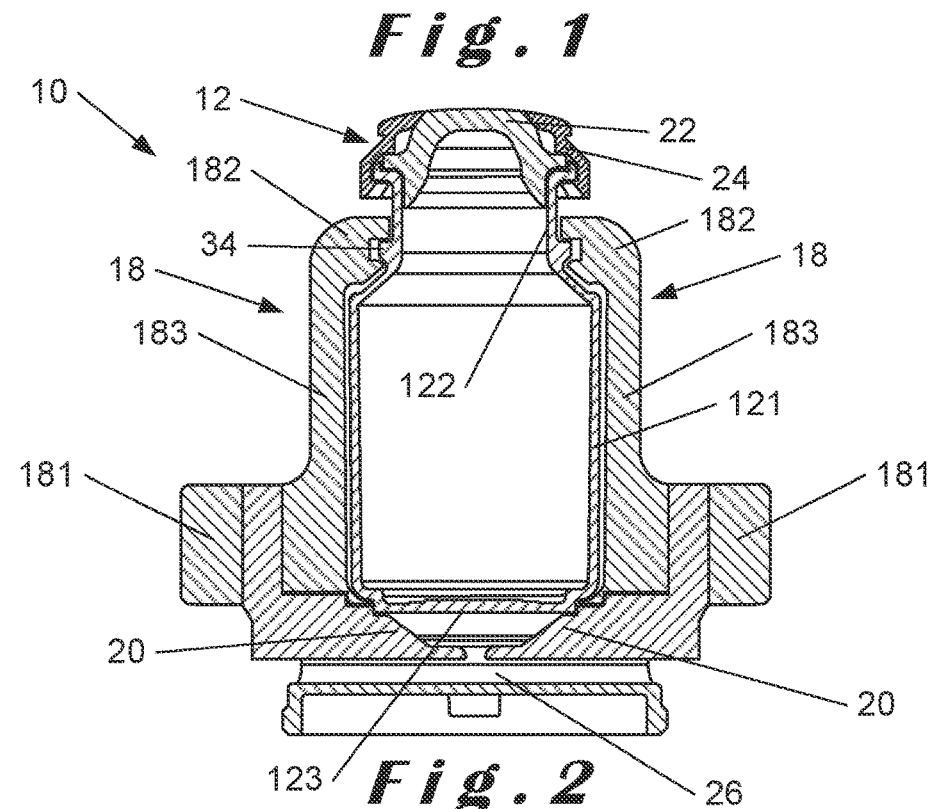
FIG. 2, a schematic view of a detail of the system shown in FIG. 1.
Figure 3:
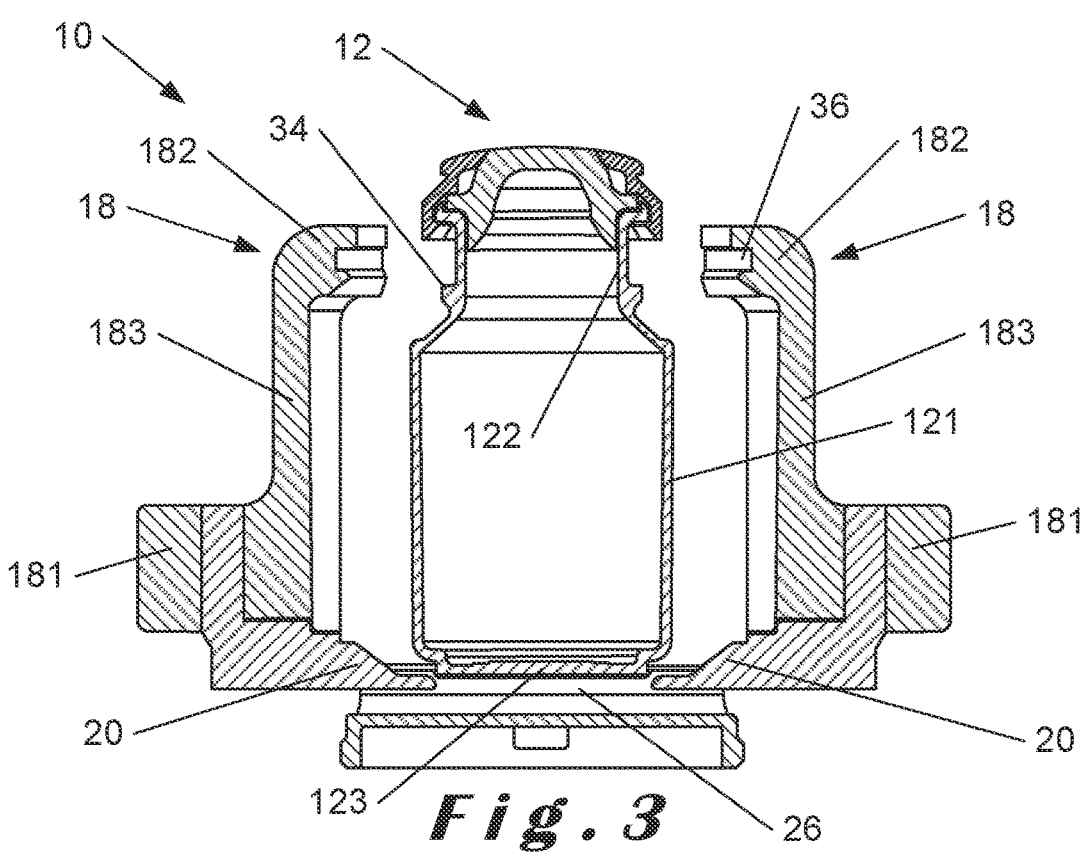
FIG. 3, a schematic view of a detail of the system shown in FIG. 1.

FIGS. 2 and 3 illustrate schematic views of a detail of the system 10 shown in FIG. 1. More specifically, FIGS. 2 and 3 show a detailed view of the clamps 18 comprising the ramps 20.

FIG. 2 shows the clamps 18 in a closed configuration for gripping the container 12. The pair of clamps 18 clamp the container 12 to grip it. The clamps 18 are used to immobilise the container 12 so that it can be driven to a subsequent station for processing the containers 12. In the closed configuration, the clamps 18 can also be used to immobilise a container 12 in a vertical direction—upwards and/or downwards. This allows to act on the container without it escaping the clamps 18. For example, in the case of filling previously sealed sterile containers, the container 12 is immobilised vertically to withstand the force of insertion (from top to bottom) of the filling needle through the cap 22 of the container and the force of removal (from bottom to top) of the needle after the substance has been introduced into the container 12 by the needle. The container 12 is also immobilised vertically to withstand a force applied from top to bottom on the cap 22 to close the container 12 after filling, for example by using a laser in the case of filling previously closed sterile containers. The container 12 is also vertically immobilised to withstand a downward force applied to the cap to affix a capsule 24 to the cap 22. FIG. 3 shows the clamps 18 in an open configuration for releasing the container 12. The clamps 18 are moved away from the container 12 to release it. The clamps 18 allow to deposit the container 12 on a station 26. For example, it may be a weighing station; releasing the container allows the container 12 to be weighed without the weighing being distorted by friction or the electrostatic influence of the clamps 18—making the weighing accurate.

Between FIG. 3 and FIG. 2, the ramps 20 are suitable for lifting the container 12 between the open configuration and the closed configuration of the clamps 18. The container 12 is lifted from the station 26 by the ramps 20 as the clamps 18 close. The container 12 is moved along the ramps, allowing for operating a smooth movement. Between FIG. 2 and FIG. 3, the ramps 20 are suitable for depositing the container 12 between the closed configuration and the open configuration of the clamps 18. The container 12 is deposited on the station 26 by the ramps 20 during the opening movement of the clamps 18. The container 12 is moved along the ramps, allowing for operating a smooth movement, without bouncing on contact with the station 26—avoiding the container 12 tipping over and an inaccurate location on the station 26. The portion of the container 12 in contact with the ramps 20 is the bottom 123 of the container 12.

The system 10 allows the containers 12 to be precisely located at each station 26. When the clamps 18 move to the closed configuration, the position of the containers 12 lifted by the ramps 20 is precisely known in a horizontal and vertical plane. This allows precise action to be taken on the containers gripped by the clamps. For example, when filling pre-closed sterile containers, a needle is inserted at a precise point on the cap 22, allowing this point to be sealed precisely; a capsule 24 is also affixed precisely. When the clamps 18 move to the open configuration, the position of the containers 12 deposited by the ramps 20 on a station is precisely known at the station 26. In particular, a rebound movement of the containers 12 on contact with the stations 26 is avoided, which reduces the stabilisation time of the container 12 on the station 26. This means that actions can be taken on containers that have been released and positioned at the stations quickly and accurately. For example, this allows the container to be weighed quickly and accurately before and after the medicinal substance is added, so that the precise quantity can be determined. The containers are then gripped again by the clamps 18 in a precise manner because the containers 12 are in a known location on the plane of the stations 26—unlike systems in the prior art where the containers 12 are pushed from one station to another, the momentum imparted to the containers preventing the position of the containers 12 from being known precisely. As a result, the system allows the containers to be handled quickly and accurately, to meet industrial production rates while delivering precise results.

The ramps 20 of a pair of clamps 18 have a slope facing each other. Thus, by closing the clamps 18 of a pair, the ramps move towards each other to lift the container 12 from the station 26 and by opening the clamps 18 of the pair, the ramps move away from each other to deposit the container 12 on the station 26. The ramps make it easy to adapt to the height difference between the clamps 18 and the station 26. The ramps 20 allow the container to slide in the direction in which it is gripped or released by the clamps 18, allowing to deposit or lift the containers 12 smoothly—which contributes to the advantages mentioned in this description.

Figure 4:
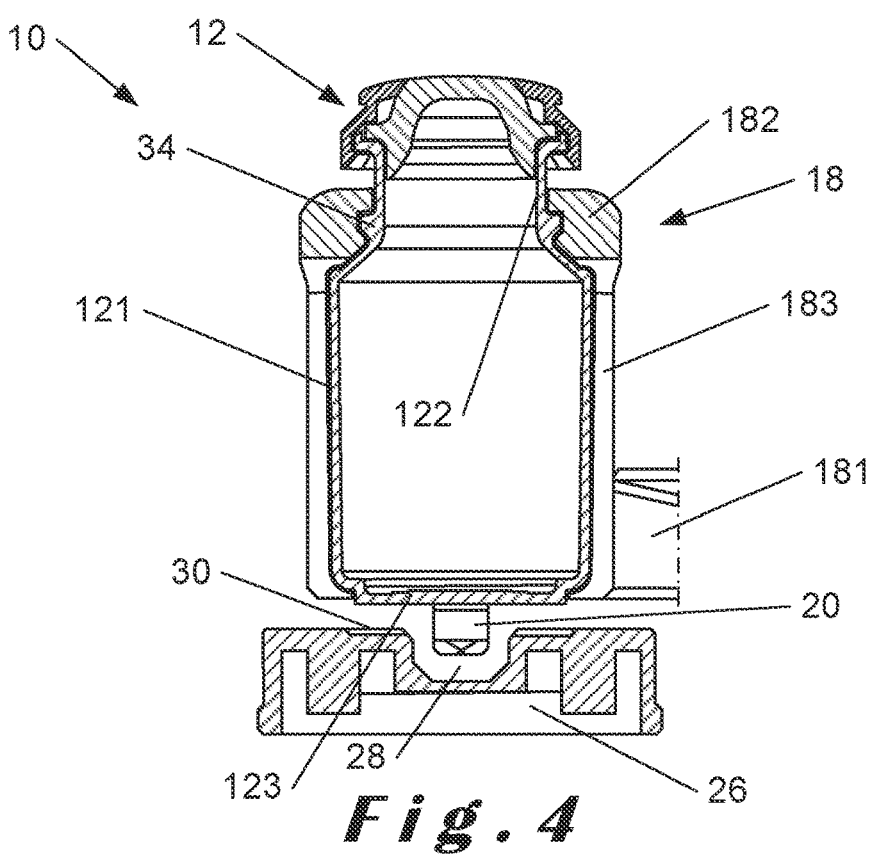
FIG. 4, a schematic view of a detail of the system shown in FIG. 1.
Figure 5C:
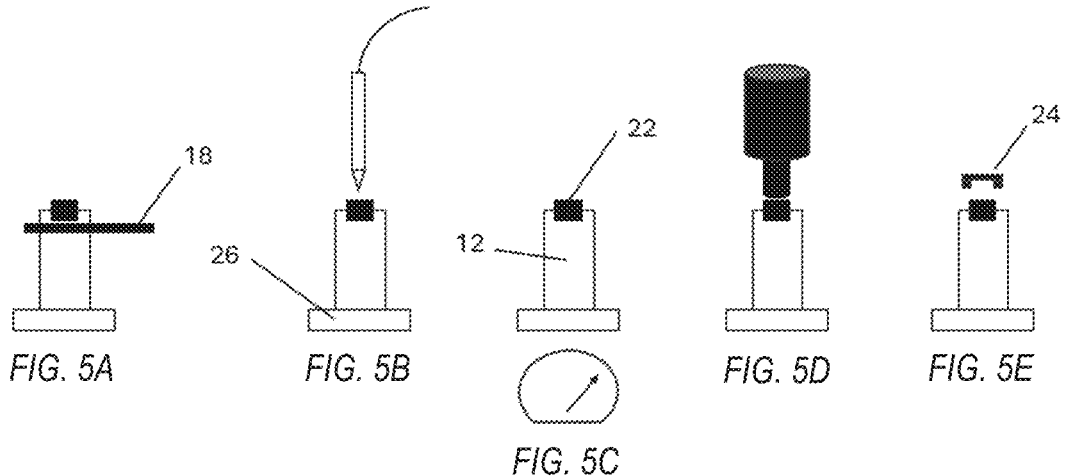
FIG. 5C, a schematic illustration of a weight station of the system shown in FIG. 1.

FIG. 4 illustrates another detail of the system 10 shown in FIG. 1. FIG. 4 is a cross-section perpendicular to the views in FIGS. 2 and 3. In the example shown in FIG. 4, the stations 26 of the system 10 comprise a groove 28 in which the ramps 20 of a clamp 18 are suitable for moving between the open and closed configurations. The clamps 18 in FIG. 4 are in a closed configuration, in which the container 12 has been lifted from the station 26. In order to deposit or lift a container 12 from the station 26, the clamps 18 of a pair are actuated with the ramps 20 penetrate towards or away from each other in the groove 28. This allows the ramps 20 to be actuated under a surface 30 of the stations 26 on which the containers 12 are to be deposited. The ramps grip the containers 12 at the bottom of the containers 12, moving along the groove 28. The lowest end of the ramps is in the groove 28, and therefore lower than the surface 30 where the containers are deposited. The highest end of the ramps 20 is above (or in other words, outside) the groove 28, and thus higher than the surface 30 where the containers are deposited. When moving from the closed configuration of FIG. 2 to the open configuration of FIG. 3, the ramps 20 move away from each other in the groove 28 to deposit the container on the surface 30 of a station 26. The container slides down the ramps 20 until it comes into contact with the surface 30 and is deposited there, immobilised, without bouncing. Conversely, when moving from the open configuration of FIG. 3 to the closed configuration of FIG. 2, the ramps 20 penetrate towards each other in the groove 28 to lift the container from the surface 30 of a station 26. The container slides up the ramps 20 until it is immobilised between the clamps 18.

The clamps 18 can comprise an arm 181 which is hinged to the wheel 14 and supports a jaw 182 and the ramp 20. The arms 181 are hinged to the wheel 14 by hinges 32 visible in FIG. 1. The arms 181 can be actuated by a cam mechanism not visible in the figures, allowing the clamps 18 to be opened or closed according to the angular position of the wheel 14—and therefore the position of the clamps relative to the stations 26. The jaws 182 of a pair of clamps 18 are designed to come into contact with the containers 12 and thus immobilise the containers 12. A pair of jaws 182 clamp a container so as to immobilise it in a vertical direction, upwards and downwards. The jaws 182 are shaped to match the outer surface of the containers 12. The jaws have a arcuate shape that follows the outer diameter of the containers 12. The jaws 182 prevent the containers 12 from tipping over when they are engaged in the clamps. The pairs of jaws 182 can clamp the containers over more than 50% of the circumference of the containers—to ensure the stability. In addition, the clamps are suitable for moving away from each other between the closed configuration and the open configuration by a dimension greater than the outer diameter of a container. In other words, the clamps are moved away from each other over a distance greater than the diameter of the containers. In the open position of the clamps, a container 12 can pass between the jaws 182 of the clamps 18. So, at stations 26 where the containers 12 are loaded onto the system 10 or at the stations 26 where the containers 12 are removed from the system 10, the containers 12 are moved horizontally between the jaws 182—possibly by a robot. This allows high productivity rates to be maintained.

In another arrangement, the clamps 18 are suitable for moving away from each other between the closed configuration and the open configuration by a dimension less than the outer diameter of a container. In other words, the clamps move away from each other over a distance smaller than the diameter of the containers. In the open position of the clamps, a container 12 cannot pass between the jaws 182 of the clamps 18, which prevents the risk of the container 12 tipping over when deposited on a station 26 (for any type of container, but particularly for small, unstable containers). So, at the stations 26 where the containers 12 are loaded onto the system 10 or at the stations 26 where the containers 12 are removed from the system 10, the containers 12 are moved vertically between the jaws 182—possibly by a robot.

Not only does the system 10 allow the containers to be handled with care, particularly when depositing them at a station, when lifting them from a station or when moving between two stations, but the system 10 also ensures that the containers 12 can be gripped without damaging the containers 12. When the clamps 18 move from the open to the closed configuration, the containers 12 slide along the ramps 20. In this way, the ramps 20 are suitable for presenting a gripping area 34 of a container 12 to the jaws 182 in the closed configuration of the clamps 18 in order to grip the containers through this area 34 by the clamps. In this way, the jaws 182 grip the containers 12 in a localised manner. This reduces the risk of damage to the rest of the surface of the container 12. The gripping area 34 can be a reinforced area of the containers 12 so that, on the one hand, this area is at a distance from the substance and, on the other hand, the reinforced nature of this area allows to reduce the risk of damage to the container by the action of the clamps. The reinforced nature of the area 34 also allows the vertical forces exerted by clamps 18 on the container 12 at certain stations 26, as mentioned above, to be taken up without damaging the outer lateral surface 121 of the body of the container 12 (between the neck 122 and the bottom 123 of the container). The gripping area 34 is, for example, a bulge located at the level of the neck 122 of the container 12. The clamps 18—by means of the jaws 182—do not touch the containers 12 over the rest of their height, according to the outer lateral surface 121 of the container body 12. The presence of the area 34 under the neck of the container 12 also reduces the risk of the container 12 tipping over during handling operations by the system 10. In order to grip the area 34 in the form of a bulge, the clamps 18, and in particular the jaws 182, can be equipped with a groove 36 of a shape suitable for gripping the bulge.

In addition, the clamps 18 each comprise a half-shell 183 partially surrounding the container 12 in the closed configuration of the clamps 18, but without touching the container 12, so as not to risk damaging the outer surface 121 of the body of the containers 12. The half-shells 183 extend between the ramps 20 and the jaws 182. In the closed configuration of the clamps, there is a space (visible in FIG. 2) between the half-shells 183 and the outer lateral surface 121 of the body of the container 12, to prevent damage. The clamps in the closed configuration are suitable for immobilising the container with a space between the clamps and the container, around the outer lateral surface 121 (between the neck 122 and the bottom 123 of the container) of the body of the container. In the closed configuration, the clamps 18 immobilise a container without coming into contact with the outer lateral surface of the body of the container. In this way, the clamps 18 are in contact with the container 12 at most at the level of the bulge 34 in the neck 122 of the container and of the bottom 123 of the container.

Preferably, the clamps 18 are electrically connected to the earth of the system 10. This ensures the electrical continuity between the clamps 18 in contact with the containers and the earth of the system 10. This allows to eliminate any electrostatic charges that may occur between the clamps 18 and the containers 12. This allows to prevent any weighing of the containers 12 (before or after introduction of the substance) from being falsified. To ensure an accurate weighing, the container 12 is preferably completely free and without electrostatic interaction with the environment—the clamps 18 for example. This also allows to prevent the containers 12 from sticking to one of the clamps when these are opened to release the containers at a station (which could cause the containers to tip over or a movement of the containers at a station). Also, to reduce the risk of electrostatic interference between the clamps and the containers when switching to an open configuration, the clamps in the same pair are moved sufficiently away from each other. The system 10 allows to reduce the risk of electrostatic charges appearing, unlike the systems of the prior art in which the containers are pushed from one station to another, the friction of the containers on the support creating electrostatic charges.

Also, in order to reduce the risk of electrostatic interference, the weighing stations can usefully be subjected to the action of a deioniser in order to neutralise any electrostatic charges that may have accumulated on the container.

The clamps 18, and in particular the jaws 182 and the ramps 20, are made of a synthetic material suitable for conducting the electrostatic charges. This allows to prevent the accumulation of these electrostatic charges between the clamps 18 and the container 12. In addition, the material of the clamps 18, and in particular of the jaws 182 and of the ramps 20, is also chosen to prevent damage to the containers 12 when they are gripped. In particular, the material prevents the container from being scratched. The material of the clamps 18, and in particular of the jaws 182, is for example Polyetheretherketone (PEEK) or Polyoxymethylene (POM).

The invention also relates to a method for handling containers 12 suitable for containing the medicinal substance. The method comprises providing the system 10 and providing containers 12. The method then comprises the handling of the containers 12 by the system 10. The handling of the containers comprises the lifting of the containers 12 from the stations 26 of the system or the depositing of the containers 12 on the stations 26 by passing clamps 18 between closed or open configurations. This allows precise handling of the containers 12, avoiding the appearance of harmful electrostatic forces when processing the containers at the various stations 26 and momentum in the movement of containers existing in the systems where the containers are pushed from one station to another. During the handling of the containers in the handling method, between the open configuration and the closed configuration of the clamps 18, the ramps penetrate the groove 28 of the stations 26 to lift a container from the station 26. This allows the containers to be handled with care, positioned and kept precisely at the right height between the clamps, while countering the vertical upward and downward forces generated by the processes implemented at the various stations. Also, during the handling of the containers in the handling method, between the closed configuration and the open configuration of the clamps 18, the ramps move away from each other in the groove 28 of the stations 26 to deposit a container on the station 26. Once again, this allows the containers to be handled carefully and positioned precisely on the stations. Generally speaking, the method also avoids damaging the outer surface of the body of the bottles.

The present invention has been described above in connection with specific embodiments, which are illustrative and should not be considered limiting. In general, it will be apparent to a person skilled in the art that the present invention is not limited to the examples illustrated and/or described above.

What is claimed is:

1. A system for handling containers suitable for containing a medicinal substance, the containers having a bottom, the system comprising:

a wheel movable in rotation about an axis, container handling clamps, the clamps being hinged to the wheel and being movable between a closed configuration for gripping a container and an open configuration for releasing a container, each pair of clamps comprising ramps suitable for lifting or depositing a container as the clamps move from one configuration to another, and stations, the clamps being suitable for depositing a container on the stations and for lifting a container from the stations, the stations comprise a groove in which the ramps of a clamp are suitable for moving between the open and closed configurations, the ramps configured to engage a bottom of a container when the ramps move along the groove such that the container slides along the ramps to lift the container from or deposit the container on a respective station.

2. The system according to claim 1, wherein the ramps are suitable for lifting a container between the open configuration and the closed configuration of the clamps and are suitable for depositing a container between the closed configuration and the open configuration of the clamps.

3. The system according to claim 1, wherein the clamps in the closed configuration immobilise a container in a vertical direction.

4. The system according to claim 1, wherein the clamps in the closed configuration are suitable for immobilising the container with a space between the clamps and the container, around the outer lateral surface of the container.

5. The system according to claim 1, wherein the ramps of a pair of clamps have a slope facing each other.

6. The system according to claim 1, wherein between the open configuration and the closed configuration of the clamps, the ramps are suitable for penetrating the groove to lift a container from a station.

7. The system according to claim 6, wherein, between the closed configuration and the open configuration of the clamps, the ramps are suitable for moving away from each other in the groove to deposit a container on a station.

8. The system according to claim 1, wherein the wheel is movable in rotation incrementally between different stations.

9. The system according to claim 1, further comprising, at each station, members amongst members for introducing a container between the clamps, members for introducing a medicinal substance into the containers, members for weighing the empty containers containing the medicinal substance, members for closing the containers, and members for affixing a capsule to the containers.

10. The system according to claim 1, wherein the clamps are suitable for moving away from each other between the closed configuration and the open configuration by a dimension greater than the outer diameter of a container.

11. The system according to claim 1, wherein the clamps are suitable for moving away from each other between the closed configuration and the open configuration by a dimension less than the outer diameter of a container.

12. The system according to claim 1, wherein the clamps comprise an arm having a first end section and a second end section opposite the first end section, the first end section hinged to the wheel, and the second end section supporting a jaw and a ramp.

13. The system according to claim 12, wherein the ramps are suitable for presenting a gripping area of a container to the jaws in the closed configuration of the clamps.

14. The system according to claim 1, wherein the clamps are electrically grounded.

15. The system according to claim 1, wherein the clamps are made of a synthetic material suitable for conducting electrostatic charges.

16. A method for handling containers suitable for holding a medicinal substance, the containers having a bottom, the method comprising providing the system comprising:

a wheel movable in rotation about an axis, container handling clamps, the clamps being hinged to the wheel and being movable between a closed configuration for gripping a container and an open configuration for releasing a container, each pair of clamps comprising ramps suitable for lifting or depositing a container as the clamps move from one configuration to another, and stations, the clamps being suitable for depositing a container on the stations and for lifting a container from the stations, the stations comprise a groove in which the ramps of a clamp are suitable for moving between the open and closed configurations, the ramps engaging a bottom of a container when the ramps move along the groove such that the container slides along the ramps to lift the container from or deposit the container on a respective station; and handling of the containers by the system.

17. The method according to claim 16, wherein the handling of the containers by the system comprises lifting the containers from the stations or depositing the containers on the stations by passing the clamps between closed or open configurations.

18. The method according to claim 17, wherein between the open configuration and the closed configuration of the clamps, the ramps penetrate into the groove of the stations to lift a container from the station.

19. The method according to claim 16, wherein, between the closed configuration and the open configuration of the clamps, the ramps move away from each other in the groove of the stations to deposit a container on the station.

* * * * *